United States Patent [19]
Hügel et al.

[11] Patent Number: 5,307,259
[45] Date of Patent: Apr. 26, 1994

[54] PROCESS FOR COMPENSATING A PHASE AND AMPLITUDE RESPONSE BETWEEN A MULTIPHASE SETPOINT AND ACTUAL VALUE AND CIRCUIT FOR IMPLEMENTING THE PROCESS

[75] Inventors: Harald Hügel, Herzogenaurach; Günter Schwesig, Erlangen, both of Fed. Rep. of Germany

[73] Assignee: Siemens Aktiengesellschaft, Munich, Fed. Rep. of Germany

[21] Appl. No.: 777,418
[22] PCT Filed: May 31, 1989
[86] PCT No.: PCT/DE89/00345
 § 371 Date: Nov. 27, 1991
 § 102(e) Date: Nov. 27, 1991
[87] PCT Pub. No.: WO90/15472
 PCT Pub. Date: Dec. 13, 1990
[51] Int. Cl.⁵ .............................................. H02P 5/40
[52] U.S. Cl. .................................. 364/176; 364/148; 318/799; 363/36
[58] Field of Search ............... 364/176, 177, 183, 161, 364/162, 148; 318/606, 608, 135, 799, 800, 802, 803; 328/155; 363/36

[56] References Cited
U.S. PATENT DOCUMENTS

| | | | |
|---|---|---|---|
| 4,238,715 | 12/1980 | Parsch et al. | 318/135 |
| 4,418,308 | 11/1983 | Bose | 318/800 |
| 4,451,771 | 5/1984 | Nagase et al. | 318/799 |

FOREIGN PATENT DOCUMENTS

0084367 7/1983 European Pat. Off. .

OTHER PUBLICATIONS

IECON '84 Proceedings, 1984 Int. Conf. on Ind. Elec. Cont. and Instr., vol. 1, Oct. 26, 1984, IEEE, New York, U.S., pp. 572–574; T. Kuga et al.: "Sinusoidal Cyclo-Converter for Mine Hoist Drive".

Erich Eder: "Stromrichter zur Drehzahlsteuerung von Drehfeldmaschinen", Part 3, Umrichter, 1975, pp. 102–111.

*Primary Examiner*—Jerry Smith
*Assistant Examiner*—Steven R. Garland
*Attorney, Agent, or Firm*—Kenyon & Kenyon

[57] ABSTRACT

The invention relates to a process for compensating a phase and amplitude response between a multiphase setpoint and actual value ($i_{Rw}$, $i_{Sw}$, $i_{Tw}$ and $i_{Rx}$, $i_{Sx}$, $i_{Tx}$), the first step being to determine the modulus setpoint value ($|i_w|$) or modulus actual value ($|i_x|$) and the angular setpoint value ($\epsilon_w$) or angular actual value ($\epsilon_x$) of the setpoint or actual value vector ($i^w$ or $i^x$), a modulus manipulative variable ($|i_{wxy}|$) and an angular manipulative variable ($\epsilon_{wxy}$) then being generated by modulus and phase from a modulus deviation ($|i_w|-|i_x|$) and an angular deviation ($\epsilon_w-\epsilon_x$) which are added by modulus and phase to the output quantities ($|i_w|$, $\epsilon_w$) of the setpoint value vector computer (26), these modulus and phase sums ($|i_{Kw}|$, $\epsilon_{Kw}$) being transformed into a multiphase, compensated setpoint value ($i_{RKw}$, $i_{SKw}$, $i_{TKw}$), and to a circuit arrangement for implementing the process. It is possible in this way for the phase and amplitude response to be compensated between a multiphase setpoint and actual value ($i_{Rw}$, $i_{Sw}$, $i_{Tw}$ and $i_{Rx}$, $i_{Sx}$, $i_{Tx}$) although a phase and amplitude response depends on the response characteristic of a controlled system which is dependent on a disturbance variable ($M_z$).

10 Claims, 6 Drawing Sheets

PROCESS FOR COMPENSATING A PHASE AND AMPLITUDE RESPONSE BETWEEN A MULTIPHASE SETPOINT AND ACTUAL VALUE AND CIRCUIT FOR IMPLEMENTING THE PROCESS

BACKGROUND OF THE INVENTION

The invention relates to a process for compensating a phase and amplitude response between a multiphase setpoint and actual value and circuit for implementing the process.

Specifying a command variable W, for example in accordance with a timing function $W(t) = W \sin(\alpha t)$ on a known control loop consisting of setpoint adjuster, comparator, controller, controlled system and measuring transducer produces in the controlled variable a phase and amplitude shift in relation to the command variable W. With increasing frequency of the command variable W, the phase and amplitude response varies between setpoint and actual value. An undesired phase and amplitude response between setpoint and actual value is also produced in the case of multiphase control loops. A multiphase control loop represents, for example, a conventional current control for a three-phase current drive with voltage-controlled convertor. The amplitude and phase of actual value can be measured or determined without distortion in this multiphase control loop.

The phase and amplitude response is determined by the response characteristic of the control loop. If this response characteristic is known, the phase and amplitude response of the control loop can be compensated by a correction device in the command channel. If, by contrast, the response characteristic of the controlled system is a function of the disturbance variable or dependent on controlled variables which are not known or cannot be measured, the said type of phase and amplitude response can be compensated only insufficiently by means of a correction device in the command channel.

The textbook "Stromrichter zur Drehzahlsteuerung von Drehfeldmaschinen" (Static convertors for speed control of polyphase machines), Part III, Convertors, by Erich Eder, 1975, pages 102 to 111 discloses resolvers by means of which a two-phase system having two orthogonal currents is formed from a three-phase system. A current vector which rotates can be formed from these two orthogonal currents. The modulus of this current vector and the rotary angle are formed by means of a C/P transformer (Cartesian/polar).

SUMMARY OF THE INVENTION

It is the object of the invention to specify a process for compensating a phase and amplitude response between a multiphase setpoint and actual value, the phase and amplitude response being produced by a response characteristic of a controlled system which depends on a disturbance variable, and a circuit arrangement for implementing this process according to the invention.

This object is attained by a process for compensating a phase and amplitude response between a multiphase setpoint and an actual value ($i_{Rw}$, $i_{Sw}$, $i_{Tw}$ and $i_{Rx}$, $i_{Sx}$, $i_{Tx}$) consisting of the following steps:

a) determination of a modulus setpoint value ($|i_w|$) and a rotary angular setpoint value ($\epsilon_w$) of a setpoint value vector ($i_w$) formed from the multiphase setpoint value ($i_{Rw}$, $i_{Sw}$, $i_{Tw}$), b) determination of a modulus actual value ($|i_x|$) and a rotary angular actual value ($\epsilon_x$) of an actual value vector ($i_x$) formed from the multiphase actual value ($i_{Rx}$, $i_{Sx}$, $i_{Tx}$), c) comparison of the modulus setpoint value ($|i_w|$) with the modulus actual value ($|i_w|$) from whose modulus differential value ($|i_w|$)−$|i_x|$) there is generated a modulus manipulated variable ($|i_{wxy}|$) which when added to the modulus setpoint value ($|i_w|$) produces a compensating modulus setpoint value ($|i_{K^w}|$), d) comparison of the rotary angular setpoint value ($\epsilon_w$) with the rotary angular actual value ($\epsilon_x$) from whose angular differential value ($\epsilon_w - \epsilon_x$) there is generated an angular setpoint value ($\epsilon_{wxy}$) which when added to the angular setpoint value ($\epsilon_w$) produces a compensating angular setpoint value ($\epsilon_{Kw}$), e) determination of a multiphase compensating setpoint value ($i_{RKw}$, $i_{SKw}$, $i_{TKw}$) of the compensating setpoint value vector (i) formed from the compensating modulus setpoint value ($|i_{K^w}|$), and the compensating rotary angular setpoint value ($\epsilon_{Kw}$).

The modulus and the rotary angle of the setpoint and actual value vector formed from the multiphase setpoint and actual value is firstly determined by this method, it then being possible to determine a system deviation separately for the modulus and the phase. This modulus differential value or this angular differential value is added to the modulus setpoint value or the angular setpoint value of the setpoint value vector. The compensating setpoint value vector thus determined, which is present as modulus and rotary angle, is transformed into a multiphase compensating setpoint value. It is possible in this way to compensate the phase and amplitude response generated by the response characteristic of the controlled system which is dependent on a disturbance variable. This produces in a stationary manner a control system without a phase and amplitude response between the setpoint and actual value.

Advantageous process steps include having the setpoint value vector ($i_w$) determined by means of a transformation of the multiphase setpoint value $i_{Rw}$, $i_{Sw}$, $i_{Tw}$) into orthogonal setpoint values ($i_{\alpha w}$, $i_{\beta w}$), the modulus setpoint value ($|i_w|$) and the rotary angular setpoint value ($\epsilon_w$) of the setpoint value vector ($i_w$) determined form the orthogonal setpoint values ($i_{\alpha w}$) by means of the following equations $$|i_w| = \sqrt{i_{\alpha w}^2 + i_{\beta w}^2}$$

$$\epsilon_w = \arctan \frac{i_{\alpha w}}{i_{\beta w}}$$

and having the actual value vector ($i_x$) determined by means of a transformation of the multiphase actual value ($i_{Rx}$, $i_{Sx}$, $i_{Tx}$) into orthogonal actual values ($i_{\alpha x}$, $i_{\beta x}$), the modulus actual value ($|i_x|$) and the rotary angle ($\epsilon_x$) of the actual value vector ($i_x$) being determined form the orthogonal actual values ($i_{\alpha s}$, $i_{\beta x}$) by means of the following equations $$|i_x| = \sqrt{i_{\alpha x}^2 + i_{\beta x}^2}$$

-continued $$\epsilon_x = \text{arctg} \frac{i_{\alpha x}}{i_{\beta x}}$$

and further having the multiphase compensated setpoint value ($i_{RKw}$, $i_{SKw}$, $i_{TKw}$) determined by means of the following equations $$i_{RKw} = i_{\alpha Kw}$$

$$i_{SKw} = -\frac{1}{2} i_{\alpha Kw} + \frac{\sqrt{3}}{2} i_{\beta Kw}$$

$$i_{TKw} = -\frac{1}{2} i_{\alpha Kw} - \frac{\sqrt{3}}{2} i_{\beta Kw}$$

the orthogonal compensated setpoint values ($i_{\alpha Kw}$, $i_{\beta Kw}$) being calculated by means of the following equations $$i_{\alpha Kw} = |i_{Kw}| \cdot \sin \epsilon_{Kw}$$

$$i_{\beta Kw} = |i_{Kw}| \cdot \cos \epsilon_{Kw}$$

In a circuit arrangement according to the invention for implementing the process having a controlled system, to which a multiphase actual value can be fed by an actuator and which is compared by means of a comparator with a multiphase setpoint value whose multiphase system deviation can be fed to the actuator via controllers, the multiphase setpoint value can be fed to a desired correction value computer at whose further inputs the multiphase actual value is present, and this desired correction value computer is connected in an electrically conductive fashion to the comparators.

Advantageous embodiments of the correction value computer include providing the input side the desired correction value computer (20) with a setpoint value vector computer (26) whose output and the output of the setpoint value vector computer (26) are connected on the input side via adders (46,48) to a second setpoint value computer (30), such that:

1. the setpoint value vector computer (26) contains a resolver (32) and a Cartesian to Polar transformer (34);
2. the actual value vector computer (28) contains a resolver (32) and a Cartesian to Polar transformer (34);
3. the second setpoint value computer (30) contains a Polar to Cartesian transformer (50) and a resolver (52); and
4. the input side the compensation circuit (36) has two differential elements (38, 40), there being connected downstream of one a proportional integral controller (42) and of the other an integral controller (44) whose outputs are connected to the outputs of the compensation circuit (36).

It is possible by means of this circuit arrangement to compensate an undesired phase and amplitude response between the multiphase setpoint and actual value in the stationary state, although the response characteristic of the controlled system is a function of the disturbance variable.

A particularly advantageous embodiment of this circuit arrangement is a microcomputer which computes the multiphase compensating setpoint value from the multiphase measured actual value and the input multiphase setpoint value by means of a computer program, so that an undesired phase and amplitude response is compensated between the setpoint and actual value.

In order to explain the invention further, reference is made to the drawings, in which an exemplary embodiment of the circuit arrangement for implementing the process according to the invention for compensating a phase and amplitude response between a multiphase setpoint and actual value is illustrated diagrammatically.

DETAILED DESCRIPTION

Figure 1:
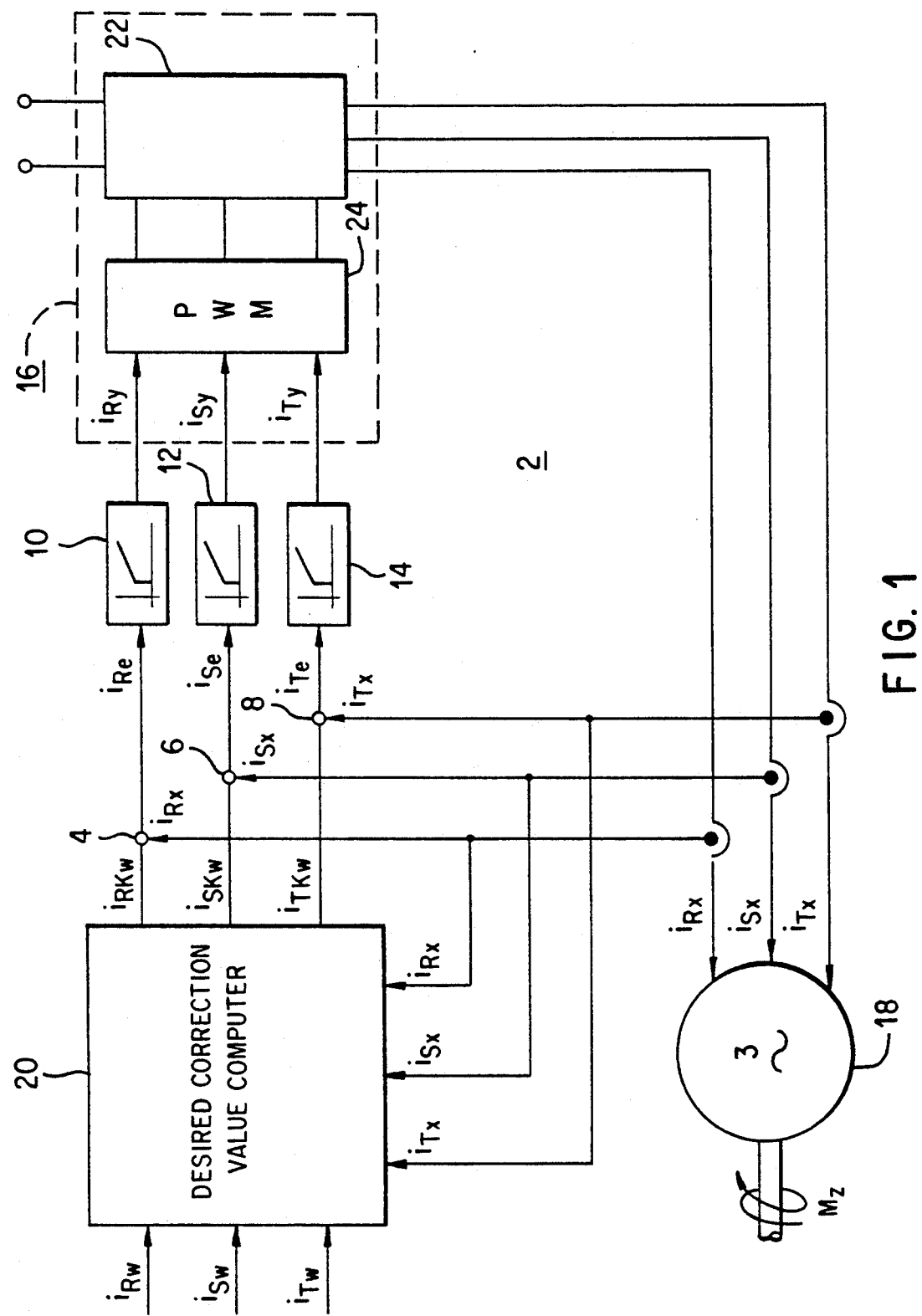
FIG. 1 shows a multiphase control loop having a circuit arrangement for implementing the process according to the invention, in FIG. 2 a block diagram of the circuit arrangement for implementing the process according to the invention in accordance with FIG. 1 is represented.

Represented in FIG. 1 is a multiphase control loop 2 which consists of a plurality of comparators 4, 6 and 8, a plurality of controllers 10, 12 and 14, an actuator 16, a controlled system 18 and a desired correction value computer 20. A conventional current control for a three-phase current drive with a voltage-controlled convertor 22, which is triggered by a pulse-width modulator 24, is provided as a concrete embodiment of this multiphase control loop 2. Current controllers having, for example, a proportional or a proportional-integral response which in each case generates a manipulated variable $i_{Ry}$ or $i_{Sy}$ or $i_{Ty}$ from a system deviation $i_{Re}$ or $i_{Se}$ or $i_{Te}$ are provided as controllers 10, 12 and 14. A three-phase current drive to which a multiphase actual value $i_{Rx}$, $i_{Sx}$ and $i_{Tx}$ is fed from the actuator 16 is provided as the controlled system 18. The response characteristic of the controlled system is also a function of a disturbance variable $M_z$, which acts on the drive shaft. A compensated, multiphase setpoint value $i_{Rkw}$, $i_{Skw}$ and $i_{Tkw}$ is generated with the aid of the multiphase actual value $i_{Rx}$, $i_{Sx}$ and $i_{Tx}$ from the multiphase setpoint value $i_{Rw}$, $i_{Sw}$ and $i_{Tw}$ present at the first inputs of the desired correction value computer 20, which is further explained in more detail in FIGS. 2 to 6. This compensated, multiphase setpoint value $i_{Rkw}$, $i_{Skw}$ and $i_{Tkw}$ is compared with the multiphase actual value $i_{Rx}$, $i_{Sx}$ and $i_{Tx}$ in correct phase. An undesired phase and amplitude response is obtained in conjunction with rising frequency of the setpoint value $i_{Rw}$, $i_{Sw}$ and $i_{Tw}$ between the multiphase setpoint value $i_{Rw}$, $i_{Sw}$ and $i_{Tw}$ and the multiphase actual value $i_{Rx}$, $i_{Sx}$ and $i_{Tx}$. The frequency and the amplitude of the multiphase setpoint value $i_{Rw}$, $i_{Sw}$ and $i_{Tw}$, which is injected into the controlled system 18 via the controllers 10, 12 and 14 and the actuator 16, is here a function of the desired speed and torque of the polyphase machine. This undesired phase and amplitude response can be compensated between the multiphase setpoint and actual value $i_{Rw}$, $i_{Sw}$, $i_{Tw}$ and $i_{Rx}$, $i_{Sx}$, $i_{Tx}$ with the aid of the desired correction value computer.

Figure 2:
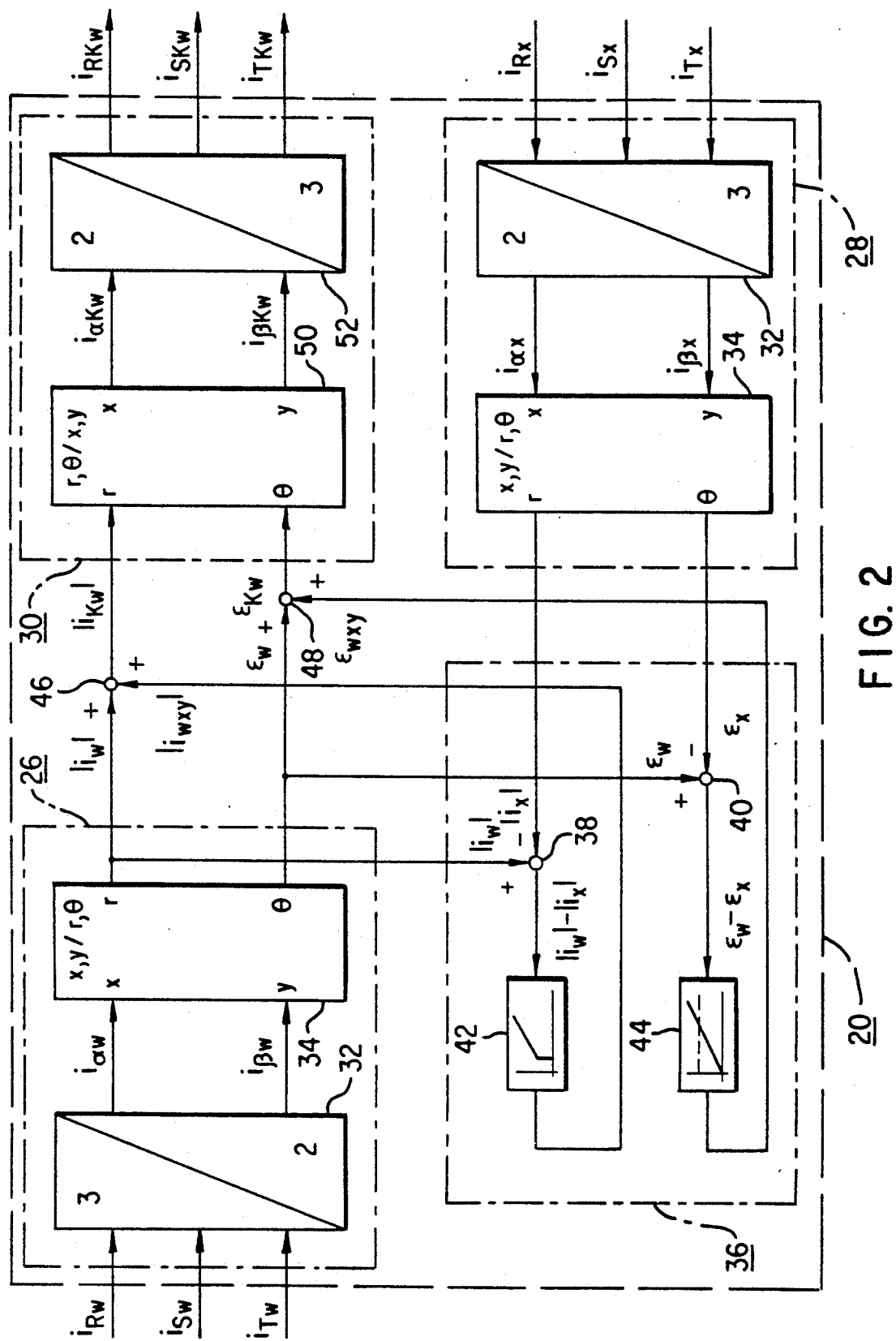

FIG. 2 represents a block diagram of the desired correction value computer 20. Provided on the input side is a setpoint value vector computer 26 and an actual value vector computer 28, and on the output side a second setpoint value computer 30. A multiphase, preferably a three-phase, setpoint value $i_{Rw}$, $i_{Sw}$ and $i_{Tw}$ is fed to the setpoint value vector computer 26. This setpoint value vector computer 26 contains a resolver 32 and a C/P transformer 34, which are connected electrically in series. The resolver 32 transforms the three-phase system into an orthogonal system. A circuit embodiment of this resolver 32 is represented in more detail in FIG. 3. The outputs of the resolver 32 provide two orthogonal setpoint values $i_{\alpha w}$ and $i_{\beta w}$, which are transformed by means of the C/P transformer 34 into a modulus setpoint value $|i_w|$ and a rotary angular setpoint value $\epsilon_w$ of the setpoint value vector $i_w$. That is to say, a Cartesian coordinate system is transformed into a polar coordinate system by means of the C/P transformer 34. A circuit embodiment of this C/P transformer 34 is represented in more detail in FIG. 4.

The actual value vector computer 28 is constructed precisely like the setpoint value vector computer 26, that is to say with a resolver 32 and a C/P transformer 34. The multiphase, preferably three-phase, actual value $i_{Rx}$, $i_{Sx}$ and $i_{Tx}$ is transformed via two orthogonal actual values $i_{\alpha x}$ and $i_{\beta x}$ into a modulus actual value $|i_x|$ and a rotary angular actual value $\epsilon_x$ of the actual value vector $i^x$ by means of these transformers 32 and 34.

Figure 3:
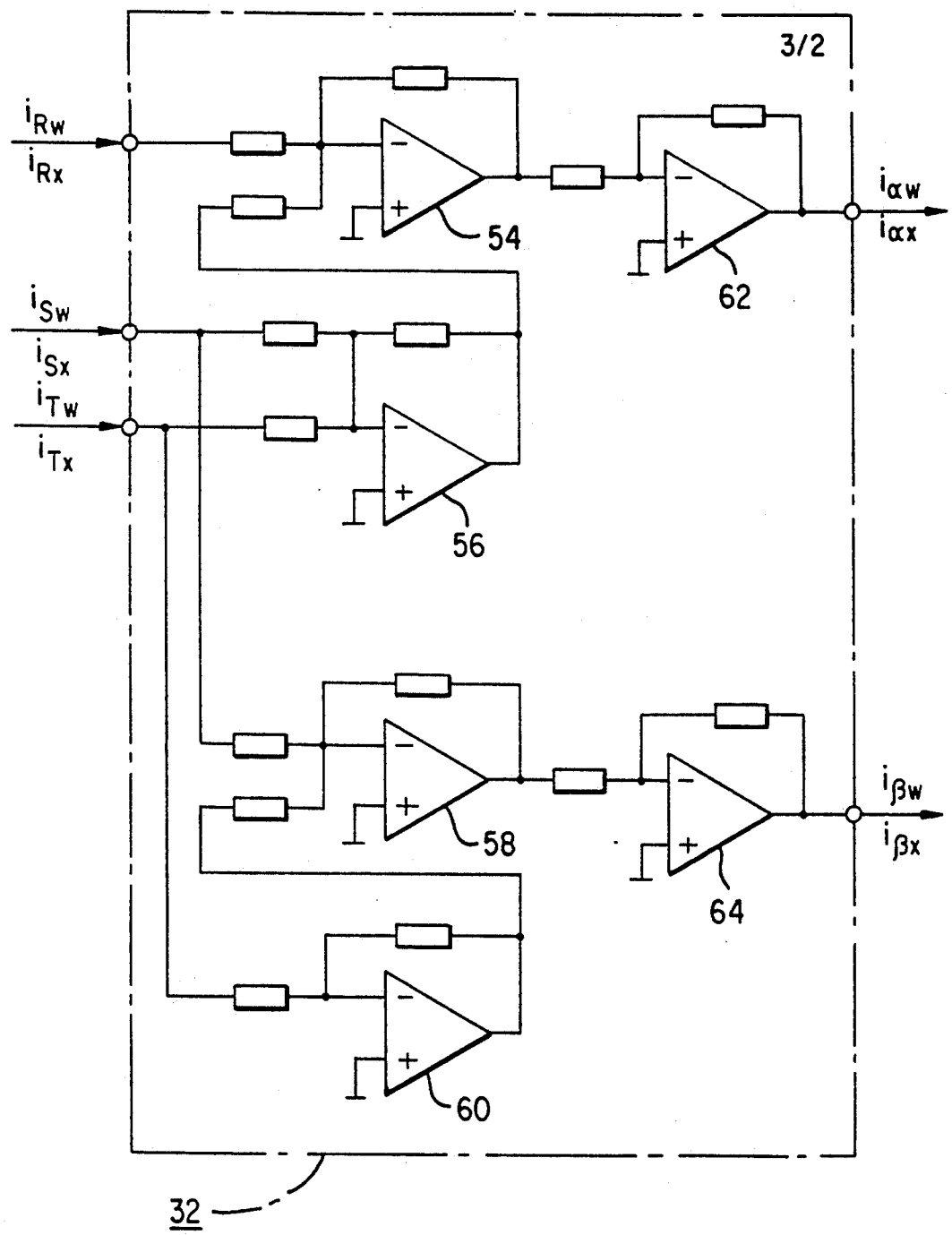
FIGS. 3 to 6 illustrate typical circuits of the individual blocks of the block diagram of the circuit arrangement according to FIG. 2.
Figure 4:
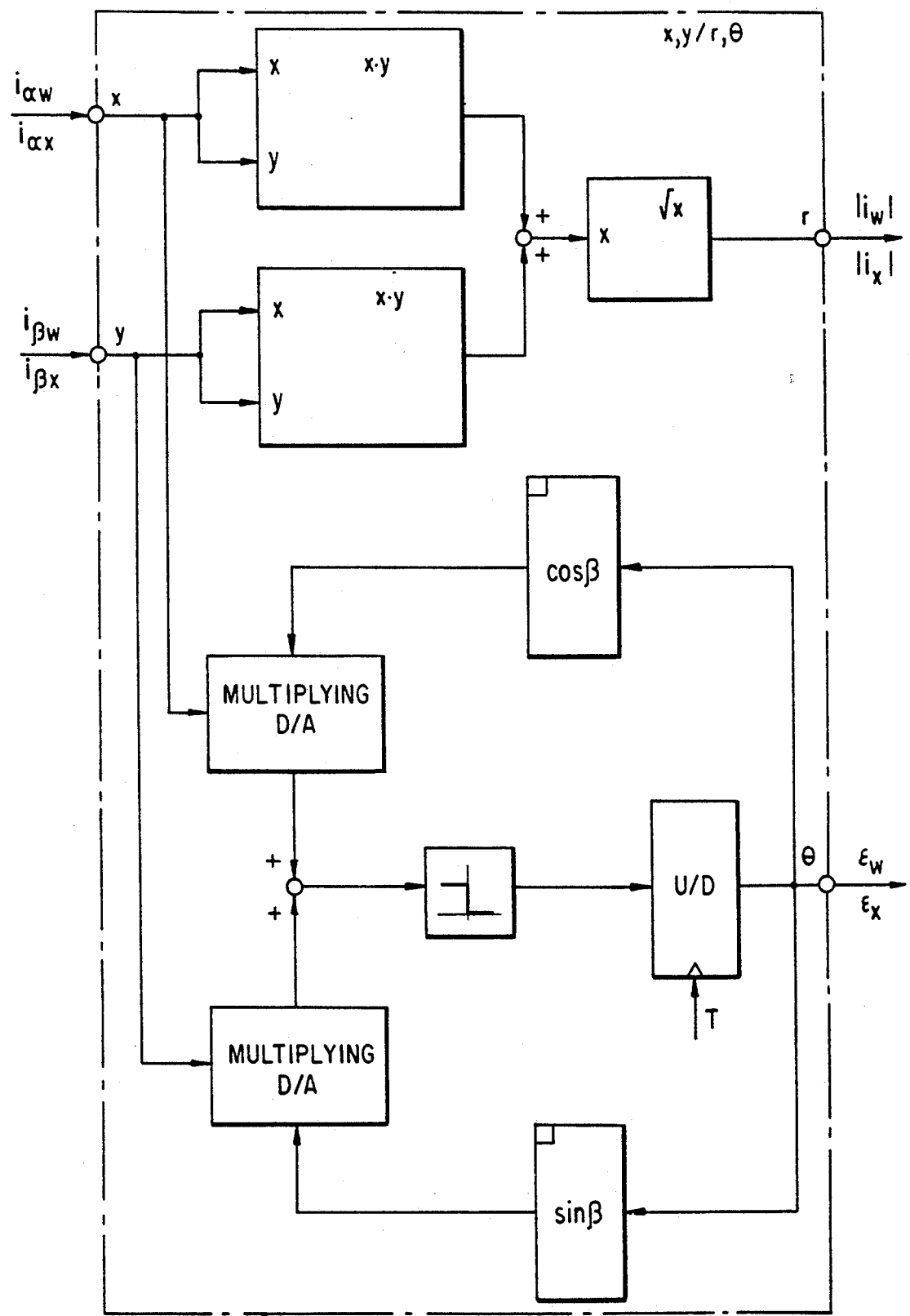

Determination of the modulus setpoint value $|i_w|$ with associated rotary angular setpoint value $\epsilon_w$ of the setpoint value vector $i_w$, and of the modulus actual value $|i_x|$ with associated rotary angular actual value $\epsilon_x$ of the actual value vector $i_x$ can be performed by hardware, as is further explained in more detail in FIGS. 3 and 4, or by software. When determination is done by software, each block 26, 28, 30 and 36 of the desired correction value computer 20 is realized approximately by a software program, the coordinate transformations on the input and output sides preferably being realized by hardware, since at least the multiphase actual value $i_{Rx}$, $i_{Sx}$ and $i_{Tx}$ an analog value.

The outputs of the desired value vector computer 26 and the actual value vector computer 28 are connected on the input side to a compensation circuit 36, the modulus setpoint value $|i_w|$ and the modulus actual value $|i_x|$ being connected to a first differential element 38, and the angular setpoint value $\epsilon_w$ and the angular actual value $\epsilon_x$ being connected to a second differential element 40. Present at the output of the first differential element 38 is a modulus differential value $|i_w|-|i_x|$, from which a modulus manipulated variable $|i_{wxy}|$, which is present at the output of the compensation circuit 36, is generated by means of a controller 42. Present at the output of the second differential element 40 is an angular differential value $\epsilon_w-\epsilon_x$, from which an angular manipulated variable $\epsilon_{wxy}$, which is present at a further output of the compensation circuit 36, is generated by means of a further controller 44. A controller acting in a proportional-integral fashion is provided as the controller 42. A controller acting in an integral fashion is provided as the controller 44. The more the actual value vector $i_x$ deviates in modulus and phase from the setpoint value vector $i_w$, the greater is the modulus manipulated variable $|i_{wxy}|$ and the angular manipulated variable $\epsilon_{wxy}$ at the two outputs of the compensation circuit 36.

The outputs of the setpoint vector computer 26 and the outputs of the compensation circuit 36 are added in terms of modulus and phase by means of two adders 46 and 48. A compensated modulus setpoint value $|i_{Kw}|$ is present at the output of the adder 46, and a compensated angular setpoint value $\epsilon_{Kw}$ is present at the output of the adder 48. This compensated setpoint value vector $i_{Kw}$ it represented by modulus and phase is transformed by means of the second setpoint value computer 30 into a three-phase compensated setpoint value $i_{RKw}$, $i_{SKw}$ and $i_{TKw}$.

Figure 5:
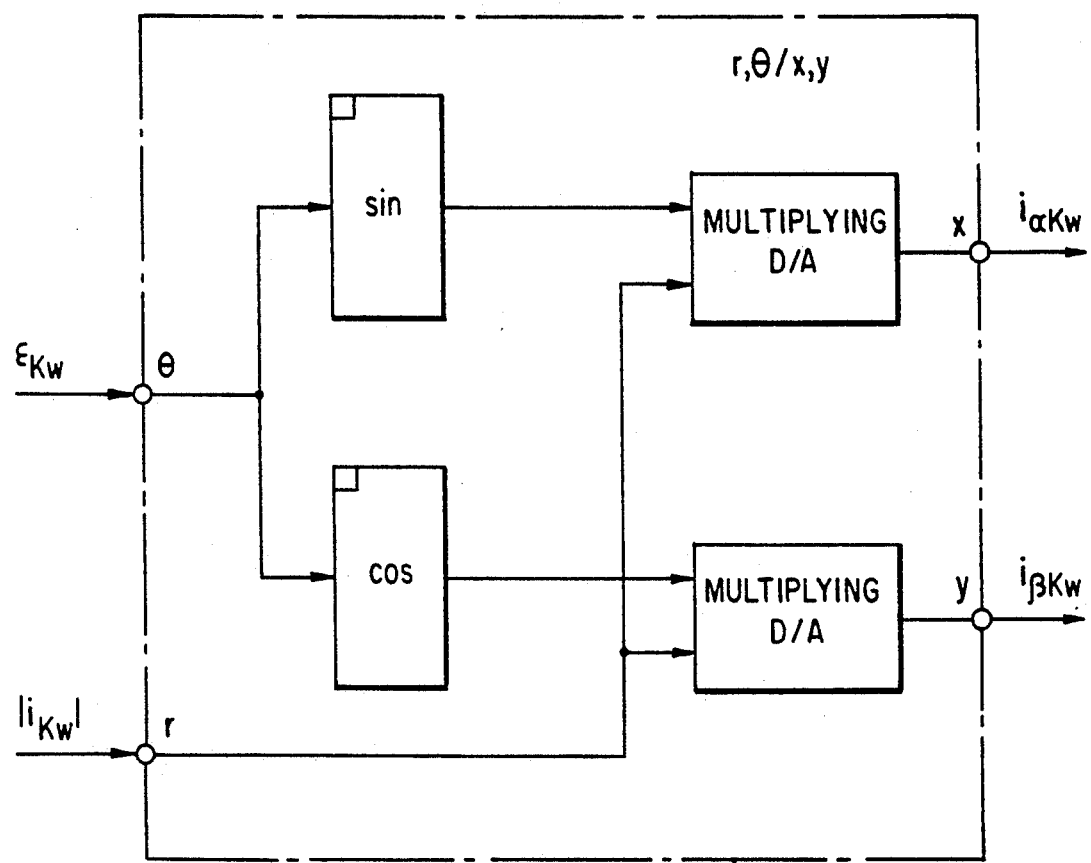
Figure 6:
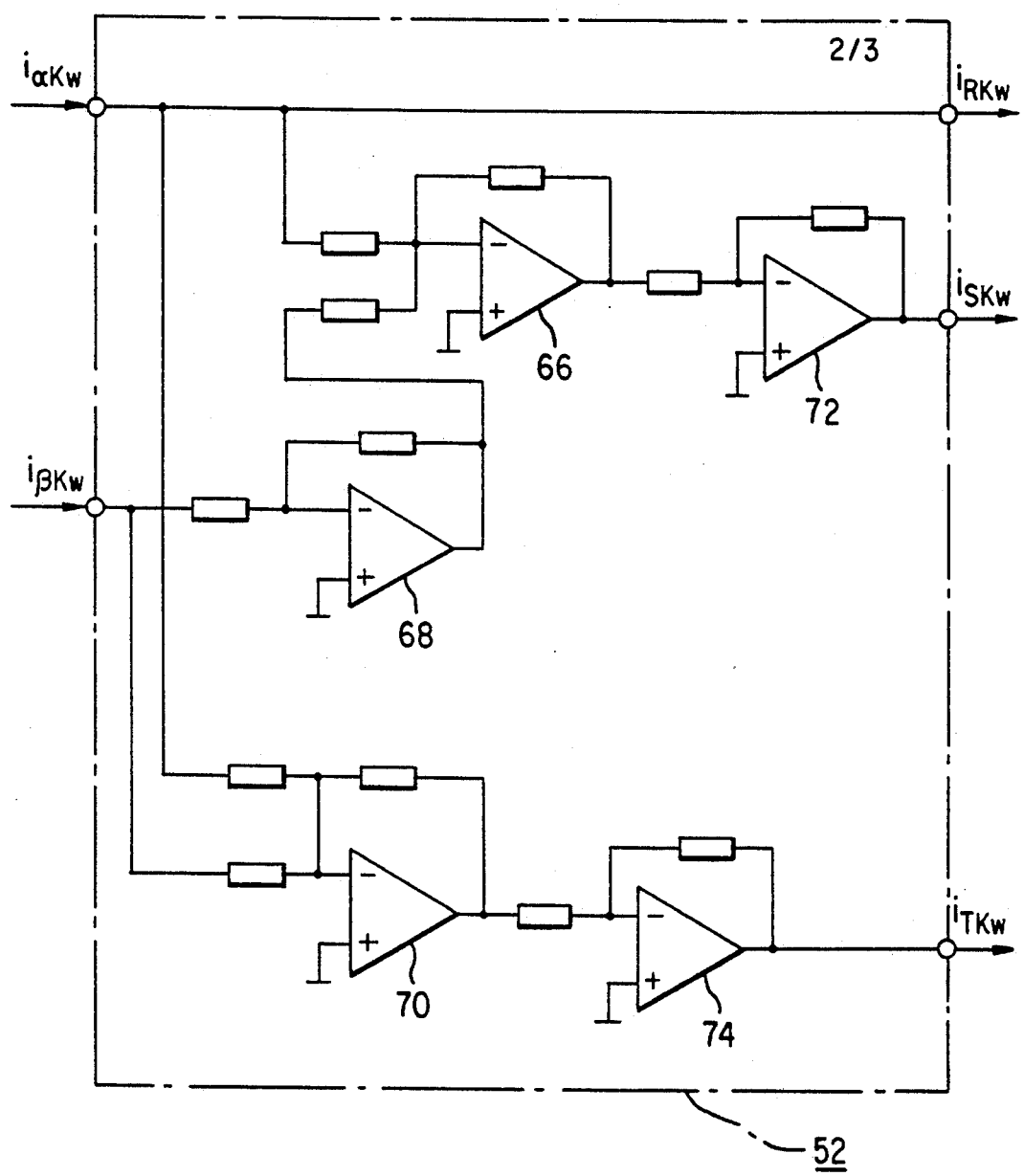

The second setpoint value computer 30 contains a P/C transformer 50 (polar/Cartesian) and a resolver 52, which are connected electrically in series. On the input side, the setpoint value computer 30 has a polar-Cartesian resolver 50, with which two orthogonal setpoint values $i_{\alpha Kw}$ and $i_{\beta Kw}$ are generated from the modulus value $|i_{Kw}|$ and the angular value $\epsilon_{Kw}$. These orthogonal setpoint values $i_{\alpha Kw}$ and $i_{\beta Kw}$ are transformed into a three-phased compensated setpoint value $i_{RKw}$, $i_{SKw}$ and $i_{TKw}$ by means of the resolver 52. Circuit embodiments of the P/C transformer 50 and of the resolver 52 are represented in FIGS. 5 and 6. This second setpoint value computer 30 can also be realized by software. In this case, an appropriate program is stored as a subprogram in the desired correction value computer 20. It would also be advantageous for only the P/C transformer 50 to be realized by software and the resolver 52 by hardware, if the subsequent control is performed digitally or in an analog fashion.

The compensation of the undesired phase and amplitude response between the multiphase setpoint and actual value $i_{Rw}$, $i_{Sw}$, $i_{Tw}$ and $i_{Rx}$, $i_{Sx}$ and $i_{Tx}$, caused by the response characteristic of the controlled system 18, which depends on the disturbance variable $M_z$ and the frequency of the setpoint value $i_{Rw}$, $i_{Sw}$ and $i_{Tw}$, is achieved with the aid of this desired correction value computer 20.

FIG. 3 represents a circuit arrangement of the resolvers 32 of the desired correction value computer 20 of FIG. 2. This resolver 32 transforms a three-phased system, for example a three-phase setpoint value $i_{Rw}$, $i_{Sw}$ and $i_{Tw}$ or a three-phase actual value $i_{Rx}$, $i_{Sx}$ and $i_{Tx}$ into an orthogonal system, for example orthogonal setpoint values $i_{\alpha w}$ and $i_{\beta w}$ or orthogonal actual values $i_{\alpha x}$ and $i_{\beta x}$. The book "Stromrichter zur Drehzahlsteuerung von Drehfeldmaschinen", (Static convertors for speed control of polyphase machines), Part III, Convertors, pages 102 to 111, especially pages 105 and 106 indicates how a two-phase system having two perpendicular currents is formed from two phase currents of a three-phase-system. The axes of the two-phase system are aligned in this case such that one axis $\alpha$ coincides with the direction of the current $i_R$. With the resolver 32 represented here, the three-phase setpoint value or actual value $i_{Rw}$, $i_{Sw}$, $i_{Tw}$ or $i_{Rx}$, $i_{Sx}$, $i_{Tx}$ are used for the purpose of calculation (by software) or determination (by hardware). The orthogonal setpoint or actual values $i_{\alpha w}$, $i_{\beta w}$ or $i_{\alpha x}$, $i_{\beta x}$ are calculated or determined by means of the circuit represented in FIG. 3 in accordance with the following equations $$i_{\alpha w,x} = \frac{2}{3} i_{Rw,x} - \frac{1}{3} i_{Sw,x} - \frac{1}{3} i_{Tw,x}$$

$$i_{\beta w,x} = \frac{1}{\sqrt{3}} \cdot i_{Sw,x} - \frac{1}{\sqrt{3}} i_{Tw,x}$$

The factors of the two equations are determined by the resistance of the individual operational amplifiers 54, 56, 58 and 60, only the two operational amplifiers 54 and 56 being employed for the setpoint or actual value $i_{\alpha w,x}$. The operational amplifier 62 or 64, which is connected as an inverter, once again cancels the phase reversal of the operational amplifiers 54 and 56 or 58 and 60. The orthogonal setpoint or actual values $i_{\alpha w}$, $i_{\beta w}$ or $i_{\alpha x}$, $i_{\beta x}$ are obtained at the two outputs.

FIG. 4 shows the C/P transformers 34 as a circuit embodiment. In this case, the section of the circuit by means of which the angle $\epsilon_w$ or $\epsilon_x$ of the setpoint or actual value vector $i_w$ or $i_x$ is determined is known from U.S. Pat. No. 4,449,117. This circuit embodiment is a hardware conversion of the two equations $$|i_{w;x}| = \sqrt{i_{\alpha w;x}^2 + i_{\beta w;x}^2}$$

$$\epsilon_{w;x} = \operatorname{arctg} \frac{i_{\alpha w;x}}{i_{\beta w;x}},$$

which can also be converted by software.

FIG. 5 represents the P/C transformer 50 as a circuit embodiment, by means of which polar coordinates $|i_{Kw}|$, $\epsilon_{Kw}$ are transformed into Cartesian coordinates $i_{\alpha Kw}$, $i_{\beta Kw}$. This transformation is performed according to the equations:

$$i_{\alpha Kw} = |i_{Kw}| \cdot \sin \epsilon_{Kw}$$

$$i_{\beta Kw} = |i_{Kw}| \cdot \cos \epsilon_{Kw}.$$

These equations have been converted by hardware, it being possible for each resolver 32, 34, 50 and 52 to be converted by software by means of a program part of a computer program when a microcomputer is used as the desired correction value computer 20.

The resolver 52 is represented as a circuit embodiment in FIG. 6. This resolver 52 transforms an orthogonal system $i_{\alpha Kw}$, $i_{\beta Kw}$ into a three-phase system $i_{RKw}$, $i_{SKw}$ and $i_{TKw}$. In this case, the three-phase system $i_{RKw}$, $i_{SKw}$ and $i_{TKw}$ is calculated by means of the following equations $$i_{RKw} = i_{Kw}$$

$$i_{SKw} = -\frac{1}{2} i_{\alpha Kw} + \frac{\sqrt{3}}{2} i_{\beta Kw}$$

$$i_{TKw} = -\frac{1}{2} i_{\alpha Kw} - \frac{\sqrt{3}}{2} i_{\beta Kw}$$

The circuit embodiment represents only one hardware conversion of the three equations, only operational amplifiers 66, 68, 70, 72 and resistors being employed for factor formation.

What is claimed is:

1. A process for compensating a phase and amplitude response of a system between a multiphase setpoint and an actual value ($i_{Rw}$, $i_{Sw}$, $i_{Tw}$, and $i_{Rx}$, $i_{Sx}$, $i_{Tx}$) comprising the following process steps:

a) determining a modulus setpoint value ($|i_w|$) and a rotary angular setpoint value ($\epsilon_w$) of a setpoint value vector ($i_w$) formed from the multiphase setpoint value ($i_{Rw}$, $i_{Sw}$, $i_{Tw}$);

b) determining a modulus actual value ($|i_x|$) and a rotary angular actual value ($\epsilon_x$) of an actual value vector ($i_x$) formed form the multiphase actual value ($i_{Rx}$, $i_{Sx}$, $i_{Tx}$);

c) comparing the modulus setpoint value ($|i_w|$) with the modulus actual value ($|i_x|$) and generating a modulus manipulated variable ($|i_{wxy}|$) from a modulus differential value ($|i_w| - |i_x|$) which, when added to the modulus setpoint value ($|i_w|$), produces a compensating modulus setpoint value ($|i_{Kw}|$);

d) comparing the rotary angular setpoint value ($\epsilon_w$) with the rotary angular actual value ($\epsilon_x$) and generating an angular setpoint value ($\epsilon_{wxy}$) from an angular differential value ($\epsilon_w - \epsilon_x$) which, when added to the angular setpoint value ($\epsilon_w$), produces a compensating angular setpoint value ($\epsilon_{Kw}$);

e) determining a multiphase compensating setpoint value ($i_{RKw}$, $i_{SKw}$, $i_{TKw}$) of the compensating setpoint value vector ($i_k^w$) formed from a compensating modulus setpoint value ($|i_{Kw}|$) and the compensating rotary angular setpoint value ($\epsilon_{Kw}$); and compensating the system based on the multiphase compensating setpoint value determined in step (e).

2. The process as claimed in claim 1, wherein the setpoint value vector ($i_w$) is determined by means of a transformation of the multiphase setpoint value ($i_{Rw}$, $i_{Sw}$, $i_{Tw}$) into orthogonal setpoint values ($i_{\alpha w}$, $i_{\beta w}$), the modulus setpoint value ($|i_w|$) and the rotary angular setpoint value ($\epsilon_w$) of the setpoint value vector ($i_w$) being determined from the orthogonal setpoint values ($i_{\alpha w}$, $i_{\beta w}$) by means of the following equations $$|i_w| = \sqrt{i_{\alpha w}^2 + i_{\beta w}^2}$$

$$\epsilon_w = \operatorname{arctg} \frac{i_{\alpha w}}{i_{\beta w}}.$$

3. The process as claimed in claim 1, wherein the actual value vector ($i_x$) is determined by means of a transformation of the multiphase actual value ($i_{Rx}$, $i_{Sx}$, $i_{Tx}$) into orthogonal actual values ($i_{\alpha x}$, $i_{\beta x}$), the modulus actual value ($|i_x|$) and the rotary angle ($\epsilon_x$) of the actual value vector ($i_x$) being determined from the orthogonal actual values ($i_{\alpha x}$, $i_{\beta x}$) by means of the following equations $$|i_x| = \sqrt{i_{\alpha x}^2 + i_{\beta x}^2}$$

$$\epsilon_x = \operatorname{arctg} \frac{i_{\alpha x}}{i_{\beta x}}.$$

4. The process as claimed in claim 1, wherein the multiphase compensating setpoint value ($i_{RKw}$, $i_{SKw}$, $i_{TKw}$) is determined by means of the following equations $$i_{RKw} = i_{\alpha Kw}$$

$$i_{SKw} = -\frac{1}{2} i_{\alpha Kw} + \frac{\sqrt{3}}{2} i_{\beta Kw}$$

$$i_{TKw} = -\frac{1}{2} i_{\alpha Kw} - \frac{\sqrt{3}}{2} i_{\beta Kw}$$

where $i_{\alpha Kw}$ and $i_{\beta Kw}$ are orthogonal compensated setpoint values, the orthogonal compensated setpoint values ($i_{\alpha Kw}$, $i_{\beta Kw}$) being calculated by means of the following equations $$i_{\alpha Kw} = |i_{Kw}| \cdot \sin \epsilon_{Kw}$$

$i_{BKw} = |i_{Kw}| \cdot \cos \epsilon_{Kw}$.

5. A circuit arrangement for implementing a process for controlling system which
   determines a modulus setpoint value ($|i_w|$) and a rotary angular setpoint value ($\epsilon_w$) of a setpoint value vector ($i_w$) formed from a multiphase setpoint value ($i_{Rw}$, $i_{Sw}$, $i_{Tw}$),
   determines a modulus actual value ($|i_x|$) and a rotary angular actual value ($\epsilon_x$) of an actual value vector ($i_x$) formed from a multiphase actual value ($i_{Rx}$, $i_{Sx}$, $i_{Tx}$),
   compares the modulus setpoint value ($|i_w|$) with the modulus actual value ($|i_x|$) and generates a modulus manipulated variable ($|i_{wxy}|$) from a modulus differential value ($|i_w| - |i_x|$) which, when added to the modulus setpoint value ($|i_w|$), produces a compensating modulus setpoint value ($|i_{Kw}|$),
   compares the rotary angular setpoint value ($\epsilon_w$) with the rotary angular actual value ($\epsilon_x$) and generates an angular setpoint value ($\epsilon_{wxy}$) from an angular differential value ($\epsilon_w - \epsilon_x$) which, when added to the angular setpoint value ($\epsilon_w$), produces a compensating angular setpoint value ($\epsilon_{Kw}$), and
   determines a multiphase compensating setpoint value ($i_{RKw}$, $i_{SKw}$, $i_{TKw}$) of the compensating setpoint value vector ($i_k^w$) formed from a compensating modulus setpoint value ($|i_{Kw}|$) and the compensating rotary angular setpoint value ($\epsilon_{Kw}$), comprising:
   a) an actuator, said actuator
      i) having an output coupled with said system and adapted to provide the multiphase actual value ($i_{Rx}$, $i_{Sx}$, $i_{Tx}$) to said system, and
      ii) having an input;
   b) comparators, each of said comparators
      i) having a first input coupled with said output of said actuator and a second input,
      ii) adapted to compare the multiphase actual value ($i_{Rx}$, $i_{Sx}$, $i_{Tx}$) with a multiphase compensated setpoint value ($i_{RKw}$, $i_{SKw}$, $i_{TKw}$) thereby determining a multiphase system deviation ($i_{Re}$, $i_{Se}$, $i_{Te}$), and
      iii) having an output adapted to provide the multiphase system deviation ($i_{Re}$, $i_{Se}$, $i_{Te}$);
   c) controllers, each of said controllers
      i) having an input coupled with the output of one of said comparators and adapted to accept one of the multiphase system deviation ($i_{Re}$, $i_{Se}$, $i_{Te}$), and
      ii) having an output coupled with said input of said actuator and adapted to provide one of a multiphase manipulated variable ($i_{Ry}$, $i_{Sy}$, $i_{Ty}$) to said actuator; and
   d) a desired correction value computer, said desired correction value computer
      i) having a first input coupled with said output of said actuator and adapted to accept the multiphase actual values ($i_{Rx}$, $i_{Sx}$, $i_{Tx}$), a second input adapted to accept the multiphase setpoint values ($i_{Rw}$, $i_{Sw}$, $i_{Tw}$),
      ii) adapted to calculate the multiphase compensated setpoint values ($i_{RKw}$, $i_{SKw}$, $i_{TKw}$), and
      iii) having an output coupled with said second inputs of said comparators adapted to provide said multiphase compensated setpoint values ($i_{RKw}$, $i_{SKw}$, $i_{TKw}$).

6. The circuit arrangement as claimed in claim 5, wherein said second input of said desired correction value computer includes a setpoint value vector computer having an output and said first input of said desired correction value computer includes an actual value vector computer having an output, said output of said setpoint value vector computer and said output of said actual value vector computer each being coupled with a compensation circuit having an output, said outputs of said setpoint value vector computer and said compensation circuit and said actual value vector computer being coupled with an input of a second setpoint value computer via adders, said second setpoint value computer having a an output coupled with said output of said desired correction value computer.

7. The circuit arrangement as claimed in claim 6, wherein the setpoint value vector computer contains a resolver and a cartesian to polar coordinate transformer.

8. The circuit arrangement as claimed in claim 6, wherein the actual value vector computer contains a resolver and a cartesian to polar coordinate transformer.

9. The circuit arrangement as claimed in claim 6, wherein the second setpoint value computer contains a polar to cartesian coordinate transformer and a resolver.

10. The circuit arrangement as claimed in claim 6, wherein on the input side the compensation circuit has two differential elements, there being connected downstream of one a proportional integral controller and of the other an integral controller whose outputs are connected to the output of the compensation circuit.

* * * * *